United States Patent [19]

Witschard

[11] 4,413,092

[45] Nov. 1, 1983

[54] VINYL HALIDE POLYMER BLENDS OF ENHANCED IMPACT RESISTANCE

[75] Inventor: Gilbert Witschard, Grand Island, N.Y.

[73] Assignee: Occidental Chemical Corporation, Niagara Falls, N.Y.

[21] Appl. No.: 351,792

[22] Filed: Feb. 24, 1982

Related U.S. Application Data

[63] Continuation-in-part of Ser. No. 92,119, Nov. 7, 1979, abandoned, which is a continuation of Ser. No. 901,913, May 1, 1978, abandoned, which is a continuation-in-part of Ser. No. 892,226, Mar. 31, 1978, Pat. No. 4,192,828, which is a continuation-in-part of Ser. No. 881,949, Feb. 28, 1978, abandoned, which is a continuation of Ser. No. 172,929, Jul. 28, 1980, Pat. No. 4,319,002.

[51] Int. Cl.$^3$ .................... C08L 27/06; C08L 53/02; C08L 55/02
[52] U.S. Cl. ........................ 525/71; 525/63; 525/64; 525/65; 525/75; 525/238; 525/239
[58] Field of Search ............ 525/71, 84, 90, 91, 525/96, 63, 64, 65, 88, 238, 239

[56] References Cited

U.S. PATENT DOCUMENTS

| | | | |
|---|---|---|---|
| 3,557,252 | 1/1971 | Hsieh et al. | 525/89 |
| 3,801,529 | 4/1974 | Potter | 525/69 |
| 3,825,622 | 7/1974 | Robeson et al. | 525/69 |
| 3,975,458 | 8/1976 | Seuerini et al. | 525/89 |
| 3,988,393 | 10/1976 | Gallagher | 525/69 |
| 4,048,254 | 9/1977 | Hiller et al. | 525/89 |
| 4,161,472 | 2/1979 | Lehr | 525/80 |

FOREIGN PATENT DOCUMENTS 220155  4/1957  Australia .......................... 525/89

OTHER PUBLICATIONS

"Chem Tech" Oct. 1977, N. Platzer, pp. 634–641.
Chem. Abstract 84: P75098f.

*Primary Examiner*—J. Ziegler
*Attorney, Agent, or Firm*—James F. Tao; James F. Mudd

[57] ABSTRACT

A polymer blend capable of being molded to an impact resistant, article which comprises a vinyl halide homopolymer or copolymer, a conventional impact resistant enhancing polymer agent for polyvinyl halide wherein the monomer units consist essentially of acrylonitrile, 1,3-butadiene and styrene residues and a thermoplastic block elastomer wherein the essential and predominant monomer units are the residue of a mono-alkenyl aromatic hydrocarbon and the residue of an alkadiene hydrocarbon. The thermoplastic elastomer is normally incompatible with the vinyl halide polymer or copolymer. The vinyl halide polymer or copolymer constitutes the major proportion of said blend and the block and methacrylate polymers together constitute a minor proportion of the composition. The weight ratio of block polymer to acrylonitrile-butadiene-styrene polymer is preferably about 1:5 to about 5:1. Preferably an acrylonitrile-butadiene-styrene polymer having about the same refractive index as that of the vinyl halide resin is employed to obtain a substantially transparent or transluscent molded article.

14 Claims, No Drawings

VINYL HALIDE POLYMER BLENDS OF ENHANCED IMPACT RESISTANCE

CROSS REFERENCE TO RELATED APPLICATIONS

This is a continuation-in-part of copending U.S. application Ser. No. 92,119, filed Nov. 7, 1979, now abandoned which in turn is a continuation of U.S. application Ser. No. 901,913, filed May 1, 1978, now abandoned, which in turn is a continuation-in-part of U.S. application Ser. No. 892,226, filed Mar. 31, 1978, now U.S. Pat. No. 4,192,828. The latter case is a continuation-in-part of U.S. patent application Ser. No. 881,949, filed Feb. 28, 1978, now abandoned, continuation thereof filed July 28, 1980 as Ser. No. 172,929, now U.S. Pat. No. 4,319,002.

This invention relates to thermoplastic polymer blends capable of being molded into articles having a high impact resistance. More particularly, it is concerned with moldable polyblends containing a major proportion of a vinyl halide polymer or copolymer wherein the component polymers are inter-compatible.

BACKGROUND OF THE INVENTION

Polyvinyl halide (inclusive of vinyl halide homopolymers as well as copolymers of vinyl halide with less than about fifty percent of an ethylenically unsaturated comonomer copolymerizable with the vinyl halide) is a widely used thermoplastic having a number of favorable technological properties. However polyvinyl halide, e.g. polyvinyl chloride, especially rigid polyvinyl halide, breaks on impact very easily at low temperature (i.e. at ambient temperature or lower). It is therefore generally necessary to improve its impact resistance by addition of an appropriate polymer additive or additives (conventionally termed "polyvinyl halide impact modifiers").

The selection of an appropriate impact modifier for polyvinyl halide is highly empirical since, in addition to imparting enhanced impact strength to the polyvinyl halide substrate, the modifier should fulfill additional requirements, namely:

1. small quantities of the modifiers must suffice; (i.e. the modifier must be effective in imparting impact resistance when present in a minor proportion in the mixture of polyvinyl halide and impact modifier)
2. the good properties of the polyvinyl halide should not be adversely affected;
3. the modifiers must be incorporated into the polyvinyl halide easily;
4. the modifiers must be stable towards light and ageing if the polyvinyl halide is to be used in the open over a long period;
5. when the high impact polyvinyl halide is processed, its impact resistance must also be substantially constant when the processing conditions (e.g., temperature, time, shearing effects) vary;
6. if a transparent or translucent product is desired, light transmission (i.e. translusceny) and transparency must not be substantially impaired;
7. conventional additives and stabilizers must be usable;
8. the high impact modifiers must be physiologically acceptable.

A particularly serious defect in many polymers which might otherwise be thought to be suitable as impact modifiers for polyvinyl halide is incompatibility of the polymer additive with the polyvinyl halide. Such incompatible polymers when mixed with polyvinyl halide and subjected to elevated temperature processing conditions (as in molding) do not form stable polymer blends with the polyvinyl halide substrate, i.e. on fusion they form a polymer phase separate from the polyvinyl halide phase. The incompatible additive phase when present can impair the impact resistance as well as the light transmission and transparency of the polyvinyl halide composition. This incompatibility often manifests itself by formation, on molding of the composition, of a solid exudate on the surface of the composition which imparts an undesirable rough or lumpy handle to the composition.

Among materials which have found acceptance as polyvinyl halide impact modifiers are the polymer compositions, consisting essentially of acrylonitrile, 1,3-butadiene and styrene monomer units which are known generically as "ABS" polymers. Unfortunately these polymers, when prepared for use as polyvinyl halide impact modifiers, are relatively costly. This is especially so if a transparent or transluscent product is desired. In such instances, an ABS polymer must be prepared or synthesized under careful control so as to have about the same refractive index as the vinyl halide resin and thereby maintain the transparency or transluscency of the vinyl halide resin.

Accordingly, it would be technologically desirable to replace a portion of the ABS polymer in an ABS-modified polyvinyl halide composition by a polymer which meets the requirements for impact modification and which, desirably, is also readily available at a refractive index about the same as that of polyvinyl halide.

A readily available class of polymers, namely the block thermoplastic elastomers of a hydrocarbon alkadiene of 4 to 10 carbon atoms and a mono-alkenyl-substituted aromatic compound of the benzene or naphthalene series containing up to 20 carbons (as typified by the block polymers of 1,3-butadiene or isoprene and styrene) is known to have a refractive index about that of the polyvinyl halides (as indicated by "Modern Plastics Encyclopedia 1974–1975", Vol. 51, No. 10A, October 1974, page 563, entry 35 at the fourth and seventh vertical columns). However, as shown in the Examples set forth below, these block polymers are found in general to be incompatible with polyvinyl halide.

The following prior art is of interest but does not disclose or suggest the invention.

U.S. Pat. No. 4,048,254, (E. L. Hillier et al., issued Sept. 13, 1977) discloses polymer mixtures containing two block radial elastomers of 1,3-butadiene and styrene having different diene contents together with 5 to 75% (based on the weight of the block polymers) of certain other polymers, namely epoxide polymers, acrylic polymers, styrene-acrylonitrile polymers, polycarbonates, polyolefins, polystyrenes, polyvinyl chloride, olefin/polyvinyl chloride copolymers, preferably polyether- and polyester-urethane polymers, methyl methacrylate-styrene-1,3-butadiene copolymers, and methyl methacrylate-acrylonitrile-styrene-1,3-butadiene copolymers, as well as mixtures thereof. The compositions have a sufficient clarity, hardness, tensile strength and elongation to render them suitable for use in medicinal applications particularly as a replacement for vinyl halide polymers. Hillier et al. do not disclose an ABS polymer as a component in their polymer mixture. Moreover, the physical properties listed for the mixtures do not include impact resistance.

N. Platzer, Chemtech, October 1977, pages 634–641 discloses the use of the aforementioned block polymers as components for enhancing the impact resistance of high impact polystyrene and acrylonitrile-1,3-butadiene-styrene (ABS) copolymers. Also it is known to employ these block polymers as impact modifiers in polyethylene and polypropylene. However, the prior art does not disclose ABS polymer-modified polyvinyl halide containing the aforementioned block polymers as impact modifier components.

SUMMARY OF THE INVENTION

The invention is directed to a thermoplastic composition which is capable of being molded to a substantially transparent or translucent article and which comprises a blend of a vinyl halide polymer wherein a major proportion of the monomer units are vinyl halide monomer residues; an ABS polymer impact resistance enhancing polymer agent for polyvinyl halide and a block thermoplastic elastomer wherein the major proportion of the monomer units are residues of a monoalkenyl-substituted aromatic compound of the benzene or naphthalene series of 8 to 20 carbon atoms and a conjugated alkadiene hydrocarbon of 4 to 10 carbon atoms. The block polymer is normally incompatible with said vinyl halide polymer. The vinyl halide polymer is present in a major proportion in the blend, and the ABS polymer modifier and the block polymer taken together is present in a minor proportion in the blend. Desirably the weight ratio of said block polymer to said ABS polymer is about 1:5 to about 5:1.

The present compositions, when molded under conventional conditions of temperature and pressure, are capable of providing molded products having an impact resistance generally greater than those of the corresponding composition of polyvinyl halide modified with ABS polymer alone and of the corresponding composition (i.e. generally an incompatible mixture) of the polyvinyl halide modified with the block polymer alone. In other words, the combined presence of the ABS-polymer and the block polymer component with the polyvinyl halide according to the invention synergistically enhances the impact resistance of the polyvinyl halide. The components of the polyblend of the invention are inter-compatible even on molding and do not separate as individual solid phases. Accordingly, the formation of solid exudates (of deleterious unattractive rough handle) on the surface of the present compositions does not occur on molding. In general, the combination of ABS-polymer and the block polymer as an impact modifier for polyvinyl halide according to the invention meets or surpasses all of the requirements generally desired in a polyvinyl halide impact modifier as discussed above.

DETAILED DESCRIPTION OF THE INVENTION AND THE PREFERRED EMBODIMENTS THEREOF

The desired proportion of block polymer and ABS polymer in the present composition and the ratio of the block polymer to the ABS polymer to provide optimum impact-resistance will vary somewhat depending upon the particular ABS polymer and block polymer employed. The combination of ABS polymer constituent and the block polymer constituent is generally present in a minor proportion in the blend of the invention, that is, a proportion of about one to about fifty weight percent, preferably of about 5 to about 20 weight percent, and especially of about 8 to 15 weight percent. Similarly the vinyl halide polymer is present in a major proportion, that is, constitutes about 50 weight percent to about 99 weight percent of the blend, and preferably is present at about 80 to about 95 weight percent concentration, especially at about 85 to about 92 weight percent concentration.

The weight ratio of block polymer to ABS polymer is desirably about 1:5 to about 5:1, and preferably is about 1:4 to about 4:1.

The Polyvinyl Halide Component

The vinyl halide polymer employed as a component in the present composition can be made by any of the known polymerization processes used for preparation of these polymer e.g., vapor phase, emulsion, suspension, solution or bulk liquid phase polymerization. Conveniently vinyl halide polymers prepared by the bulk liquid phase polymerization mode are employed.

An especially desirable bulk-liquid phase-polymerized polyvinyl halide for use in the invention is obtained by free radical addition polymerization in two reaction stages, i.e. a first stage employing high speed, high shear agitation until conversion of monomer or monomers to polymer is about 3 to 15% and a second stage employing low speed, low shear agitation until polymerization is complete. This technique is disclosed in U.S. Pat. No. 3,522,227 and British Pat. No. 1,047,489, the pertinent disclosure of these patents being incorporated herein by reference.

The polyvinyl halide resin contemplated for use in the invention is a rigid resin, i.e., a resin containing less than about 10 percent plasticizer or none at all. Typically, the resin is a readily available commercial resin which is processed at a temperature on the order of about 350° F. or even higher. While vinyl chloride is the preferred vinyl halide monomer reactant used in preparing the vinyl halide polymers of the invention, other suitable vinyl halide monomers useful in the invention are the alpha-halo-substituted ethylenically unsaturated compounds which, like vinyl chloride, are capable of entering into an addition polymerization reaction, for example, vinyl fluoride, vinyl bromide, vinyl iodide, vinylidene fluoride, vinylidene chloride, vinylidene bromide, vinylidene iodide and the like. Vinyl halide polymers derived from polymerization of two, three or more different vinyl halide monomers can also be used. It is to be understood that the polyvinyl halide resin, as contemplated for use in this invention, can be a modified resin, e.g., a copolymer resin of vinyl halide with a minor amount i.e. less than 50 weight percent of the total monomer mixture, of a comonomer, e.g. of vinyl acetate, or preferably a copolymer resin prepared by copolymerizing vinyl halide monomer with from about 1 to about 30 weight percent of a comonomer copolymerizable with the vinyl halide. Thus, while the polyvinyl halide component of the invention is preferably comprised totally of vinyl chloride homopolymer, or other vinyl halide homopolymer, the present invention is also intended to include copolymers thereof as previously described. Suitable ethylenically unsaturated comonomer materials which can be used to form the base vinyl halide copolymers (i.e. vinyl halide bipolymers, terpolymers, tetrapolymers and higher copolymers, interpolymers, and the like), by the reaction with vinyl halide include the following monoolefinic compounds:

ethylene, propylene, butene-1, 4,4-dimethylbutene-1, decene-1, styrene and its nuclear alpha-alkyl or aryl substituted derivatives, e.g., o-, m- or p-methyl, ethyl, or butyl styrene; and halogenated styrenes such as alpha-chlorostyrene; monoolefinically unsaturated esters including vinyl esters, e.g., vinyl acetate, vinyl stearate, vinyl benzoate, vinyl-p-chlorobenzoates, alkyl methacrylates, e.g., methyl, ethyl, propyl and stearyl methacrylate, alkyl crotonates, e.g., octyl crotonate; alkyl acrylates, e.g., methyl, 2-ethyl hexyl, stearyl acrylates; hydroxyether and tertiary butylamino acrylates, e.g. 2-ethoxy ethyl acrylate, isopropenyl esters, e.g., isopropenyl acetate; isopropenyl halides, e.g., isopropenyl chloride; vinyl esters of halogenated acids, e.g., vinyl alpha-chloroacetate, and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol; halo-alkyl acrylates, e.g., methyl and ethyl alpha-chloroacrylates; alkyl alpha-cyanoacrylates, e.g., methyl alpha-cyanoacrylate; itaconates, e.g., monomethyl itaconate, diethyl itaconate, alcohol (C-3 to C-8) itaconates; maleates, e.g., monomethyl maleate, diethyl maleate, alcohol (C-3 to C-8) maleates; and fumarates, e.g., monomethyl fumarate, diethyl fumarate, alcohol (C-3 to C-8) fumarates, and diethyl glutaconate; monoolefinically unsaturated organic nitriles including, for example, fumaronitrile, acrylonitrile, methacrylonitrile, 1,1-dicyanopropene-1, and oleonitrile; monoolefinically unsaturated carboxylic acids including, for example, acrylic acid, methacrylic acid, cinnamic acid, maleic, and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g. butadiene-1,3; 2-methylbutadiene-1,3; 2,3-dichlorobutadiene-1,3; and 2-bromobutadiene-1,3 and the like.

When the vinyl halide polymer component of the invention is a copolymer, said copolymer can also be a graft copolymer of a vinyl halide (or of vinyl halide and comonomer copolymerizable therewith) and a polyolefin rubber i.e. elastomer, which is characterized by being soluble, partially soluble, or dispersible at ambient or room temperature and pressure in vinyl halide monomer. The latter known vinyl halide graft copolymers are obtained by polymerizing a mixture of vinyl halide monomer with one or more ethylenically unsaturated comonomers of the type described above (or more conveniently, a vinyl halide monomer alone) in the presence of the olefin trunk polymer reactant. The polyolefin elastomer or rubber is a homopolymer, bipolymer, terpolymer, tetrapolymer or higher copolymer of olefinic monomers. The olefin polymers can also contain the residue of a polyene, e.g. a non-conjugated, diene as a monomer unit.

The aforementioned olefin homopolymers can be obtained by polymerization of a suitable monomer such as ethene, propene, i.e. propylene, butene-1, isobutene, octene, or 5-methylhexene-1.

Suitable comonomers for use in preparing the polyolefins are those utilized to prepare the olefin homopolymers as listed above, such as propene or butene-1 with ethene and the like. Suitable termonomers are those utilized to prepare homopolymers and copolymers as disclosed above such as propene, ethene and the like as well as a polyene. Especially suitable polyene-derived ter- and higher co-polymers can be prepared from olefin monomer mixtures containing up to 15 percent, preferably up to about 6 percent by weight, of the polyene (preferably non-conjugated), e.g. dicyclopentadiene, cyclooctadiene and other dienes with linear or cyclic chains. The polyolefin used may also be a halogenated polyolefin, e.g. a chlorinated, brominated or fluorinated polyolefin.

The polyolefins used are characterized by being soluble, partially soluble or dispersible at ambient temperature and pressure in vinyl chloride monomer, and in having, typically, monomeric units of 2 to 8 carbon atoms. The weight average molecular weight of the olefin polymers, copolymers, terpolymers, and tetrapolymers can vary from about 50,000 to about 1,000,000 and higher. Preferred as polyolefin rubbers for use in preparing vinyl halide graft polymers for use in the invention are ethene propene polyolefin elastomers and ethene-propene-diene polyolefin elastomers.

The vinyl halide-graft copolymers of the polyolefin elastomers are prepared by polymerizing the vinyl halide in the presence of about 0.05 to about 20% preferably about 1 to about 20%, based on the weight of vinyl halide monomer of the above-described polyolefin rubber. Preparation of such vinyl halide-polyolefin graft copolymer according to emulsion and suspension polymerization techniques is described in G. Natta et al., U.S. Pat. No. 3,812,204, the disclosure of which is incorporated herein by reference. Preparation of such vinyl halide-polyolefin graft copolymer by vapor phase and solution polymerization techniques are described, respectively, in J. Dumoulin et al., U.S. Pat. No. 3,789,083 and F. M. Rugg et al., U.S. Pat. No. 2,947,719, the disclosure of which is incorporated herein by reference. Conveniently the preparation of the vinyl halide-polyolefin graft copolymers useful as the polyvinyl halide component of the compositions of the invention is effected by a bulk liquid phase polymerization technique as described by A. Takahashi, U.S. Pat. No. 4,071,582, copending U.S. application Ser. No. 746,046, filed Nov. 30, 1976, now U.S. Pat. No. 4,163,033, and by L. E. Walker, U.S. Pat. Nos. 4,007,235 and 4,067,928, the disclosure of which Takahashi and Walker patents is also incorporated herein by reference.

It is to be understood that the above-described vinyl halide-polyolefin graft copolymers possess an impact resistance substantially greater than the impact resistance of conventional (i.e. ungrafted) vinyl halide homopolymers and copolymers. Nevertheless, the impact resistance properties of such graft copolymers is generally further improved by blending with the present ABS polymer and block polymer in accordance with the invention.

The Acrylonitrile-1,3-Butadiene-Styrene Polymer (ABS Polymer) Component

The acrylonitrile-1,3-butadiene-styrene polymers employed as components of the compositions of the invention constitute a readily available class of polymers (generally proprietary polymers) which are widely employed as impact modifiers for polyvinyl halide resins. If desired, they are available at about the same refractive index as vinyl halide resins. As recognized by the art the ABS polymers comprise either (1) a mixture of a copolymer of styrene and acrylonitrile (typically, at a monomer ratio of 60 to 80:40 to 20 styrene:acrylonitrile) with a minor amount (e.g. 10% to 40% by weight) of a copolymer of acrylonitrile and butadiene (typically at a monomer ratio of 5 to 40:95:5) or (2) a mixture of a copolymer of styrene and acrylonitrile (typically at a monomer ratio of 60 to 80:40 to 20) with a minor amount (typically 10% to 40%) of a graft of the latter styrene-acrylonitrile copolymer onto polybutadiene.

The ABS polymers are more particularly described in R. E. Gallagher, U.S. Pat. No. 3,988,393 and W. C. Calvert, Australian Pat. No. 220,155 (issued Apr. 11, 1957) the disclosures of which are incorporated herein by reference.

The Block Polymer Component

The block elastomer component of the compositions of the invention is a thermoplastic block polymer wherein the major proportion of the monomer units are derived from (1) a mono-alkenyl-substituted arene (i.e. aromatic compound) of the benzene or naphthalene series containing 8 to 20 carbons and (2) a conjugated hydrocarbon alkadiene of 4 to 10 carbon atoms. Minor amounts of other monomers may be present in the block polymer as described herein below.

The monoalkenyl arene of the benzene or naphthalene series employed as a monomer in preparing the block polymer constituent of the present composition can be, for example, styrene; o-, m- or p-methyl styrene; o-, m-, or p-n-butyl-styrene; m-isopropyl-styrene; p-t. butyl-styrene; p-octyl-styrene; 2,3-dimethyl styrene; 3-ethyl styrene; alpha methyl-styrene; p-n-dodecyl-styrene; p-methoxystyrene; p-n-butoxy-styrene; p-isopropoxy-styrene; p-n-dodecoxy styrene; m-n-octylstyrene; 1-vinyl naphthalene; 2-vinyl-naphthalene; 1-methyl-2-vinyl-naphthalene; 1-vinyl-2-n-octyl naphthalene; 1-vinyl-2-isopropyl-naphthalene; 1-vinyl-2-methoxy-naphthalene or mixtures thereof. The carbon-to-carbon double bond in the side chain of the alkenyl arene is in alpha, beta position with respect to the aromatic nucleus. Preferably the monoalkenyl-substituted arene is a hydrocarbon and the alkenyl group is the vinyl group, $CH_2=CH-$. Preferably also the monoalkenyl-substituted arene is a compound of the benzene series, especially an alkenyl-substituted compound of the benzene series containing up to 12 carbon atoms. Block polymers prepared using styrene as the mono-alkenyl-substituted aromatic monomer are especially preferred.

The conjugated hydrocarbon alkadiene monomer used to prepare the block polymer constituent of the present composition can be, for example, 1,3-butadiene; isoprene; 2,3-dimethyl-butadiene; 2-n-butyl-1,3-butadiene; 1,3-cyclohexadiene; 2-n-hexyl-1,3-butadiene; 1,3-pentadiene; 1,3-hexadiene; 1,3-decadiene; 2-isopropyl-1,3-butadiene; 2-t-butyl-1,3-butadiene; 1,3-cyclodecadiene; 2,4-octadiene; or mixtures of the foregoing cyclic or open chain alkadiene hydrocarbons. Preferably the alkadiene monomer employed in the block polymer constituent of the present composition is an open chain alkadiene and especially is 1,3-butadiene or isoprene.

While it is preferred that all of the monomer units of the present block polymer constituent consist of residues of the foregoing alkadiene and mono-alkenyl-substituted arenes, it is understood that, if desired, minor proportions of the residues of other ethylenically unsaturated compounds copolymerizable with the alkadiene and the alkenyl-substituted aromatic monomer can be present also as comonomer units, for example residues of vinyl pyridine, acrylonitrile, lower alkyl esters of acrylic acid (wherein the term lower alkyl indicates a straight or branched alkyl group of 1 to 6 carbon atoms, e.g. methyl) methacrylonitrile and vinyl carboxylates, e.g. vinyl acetate.

The weight ratio of the mono-alkenyl-substituted aromatic compound residue to the alkadiene residue can vary over a wide range. However, because of their ready availability, the block polymers preferably employed in the invention have a weight ratio of mono-alkenyl-substituted arene residue to alkadiene residue in the range of about 1:1 to about 1:10, preferably of about 1:1.5 to about 1:6 and especially of about 1:1.5 to 1:2.3.

The block polymers of the invention are generally prepared by a sequential polymerization of the monomer reactants employing an anionic addition polymerization technique. The reaction is generally carried out in the presence of a catalyst for anionic polymerization, typically an organo lithium catalyst such as n-butyl lithium. (Under the latter reaction conditions a block copolymer is formed substantially to the exclusion of formation of a conventional copolymer, i.e. a random, network, or graft copolymer, of the aforementioned monomers). The polymerization reaction is effected in an inert atmosphere under substantially anhydrous conditions. The polymerization can be carried out in the absence or presence of an inert reaction mixture diluent or solvent such as an ether devoid of functional groups containing active hydrogen, e.g. tetrahydrofuran, or an aromatic hydrocarbon such as benzene, toluene, xylene and the like. Use of an ether solvent is especially advantageous.

The preparation of the aforementioned block polymers is more particularly described in L. M. Potter, U.S. Pat. No. 3,149,182; R. N. Cooper, U.S. Pat. No. 3,030,346; R. P. Zelinski, U.S. Pat. No. 3,287,333; K. J. Silberberg, U.S. Pat. No. 3,380,863, at Col. 3, lines 5–28 and Col. 5, lines 10–40; R. A. Hinton, U.S. Pat. No. 3,452,119; J. K. Craver and R. W. Tess Ed. "Applied Polymer Science", Organic Coating and Plastics Chemistry Div. of American Chem. Soc., 1975, pages 394–429, M. Morton Ed. "Rubber Technology", Van Nostrand-Rheinhold Co., Second Edition, 1973, pages 188, 515–533 and D. C. Allport et al. Ed. "Block Copolymers", Wiley (Halstead Press), 1973, pages 81–87, G. Holden et al., U.S. Pat. No. 3,265,765; R. L. Huxtable et al., U.S. Pat. No. 3,198,774, R. E. Dollinger, U.S. Pat. No. 3,297,793; R. E. Dollinger et al., U.S. Pat. No. 3,356,763, *Encyclopedia of Polymer Science and Technology*, Vol. 15, J. Wiley and Sons, 1971 (Supplement) "Styrene-Diene Block Polymers", pages 508–530; and *Encyclopedia of Polymer Science and Technology, Supplement*, Vol. 2, J. Wiley and Sons, 1977, pages 129–132, the disclosures of which are incorporated herein by reference.

The aforementioned block polymers can be linear block polymers composed of two homopolymeric segments or blocks (termed a diblock polymer) or three (termed a triblock polymer) or more homopolymeric segments. In the triblock polymers, generally the residues of the mono alkenyl arene constitute the end block while the residues of the alkadiene constitute the interior block. The block polymers of the invention can be graded or tapered block polymers wherein, for example, one polymer segment or block of the polymer begins with a particular monomer unit and gradually incorporates another monomer unit until at the end, said block is totally composed of the second monomer units. In general in such tapered or graded block polymers (as in the aforementioned triblock polymers) mono-alkenyl arene residues constitute the end blocks while the alkadiene residues constitute the interior block or blocks.

Block polymers of a mono-alkenyl-substituted aromatic hydrocarbon monomer (e.g. styrene) and a hydrocarbon alkadiene (e.g. 1,3-butadiene or isoprene) containing tapered blocks are more particularly described at page 395 of the aforementioned Craver and Tess textbook reference; at pages 83–84 of the aforementioned Allport et al. textbook reference and the aforementioned U.S. Patent of Holden et al., U.S. Pat. No. 3,265,765.

The block thermoplastic elastomers of the invention can also be of star-like or radial polymeric structure wherein 2, 3, 4 or more homopolymeric blocks (advantageously alkadiene blocks) radiate from another, central homopolymeric block (advantageously the monoalkenyl arene block). The latter radial block polymers can be prepared in a small amount of a coupling agent (e.g. a polyfunctional alkenyl arene compound such as 1,4-divinyl benzene or a polyfunctional inorganic compound such as silicon tetrachloride) to the partially reacted reaction mass of the aforementioned anionic polymerization (which has already sufficiently reacted to form a diblock polymer).

The preparation of block polymers having a star or radial configuration is described by the Craver and Tess textbook reference at pages 395 (Table II), 421, and 422 (Table VI); by pages 131–132 of the aforementioned article of *The Encyclopedia of Polymer Science and Technology,* Supplement, Vol. 2; by the aforementioned N. Platzer, Chemtech reference, especially page 637, Column 1, lines 33–35 and FIG. 2; by the anonymous article entitled "New Rubber is Backed by Stars", Chemical Week, June 11, 1975, page 35; and especially by R. P. Zelinski et al., U.S. Pat. Nos. 3,078,254 and 3,281,383. The disclosures of the latter four references are also incorporated herein by reference.

It is emphasized that the aforementioned FIG. 2 of the Platzer reference graphically indicates the substantial distinctions between the present block copolymers and corresponding conventional copolymers (including random, network and graft copolymers). The distinctive physical, mechanical and especially processing properties which distinguish the present thermoplastic block elastomers from conventional elastomers prepared from the same monomers as are employed in block polymers are more particularly discussed in the aforementioned Morton textbook reference.

Block copolymers of styrene and 1,3-butadiene or of styrene and isoprene are readily available as proprietary polymers manufactured under the designation "Kraton" by Shell Chemical Co. and under the designation "Solprene" by Phillips Petroleum Co. As indicated by the fourth and sixth horizontal lines of the aforementioned Table VI of page 422 of the Craver and Tess textbook reference, the Kraton copolymers are linear block polymers (non-hydrogenated) of styrene and 1,3-butadiene or isoprene whereas the Solprene copolymers are radial block polymers or are block polymers containing a tapered block wherein the monomer units are derived from styrene and 1,3-butadiene.

OPTIONAL ADDITIVES

The compositions of the invention may also contain various functional additives, which additives are conventional in the preparation of vinyl halide molding compositions. Typically these additives include thermal and/or light stabilizers, as well as external and internal lubricants, and processing aids for the graft vinyl halide resin component.

Stabilizers suitable for use in making the vinyl halide graft polymer compositions of the invention include all of the materials known to stabilize polyvinyl halide against the degradation action of heat and/or light. They include all classes of known stabilizers, both organic and inorganic such as metal salts of mineral acids, salts of organic carboxylic acids, e.g. carboxylic acids of 6 to 18 carbon atoms, organo-tin compounds, epoxides, amine compounds and organic phosphites. Conveniently an organo-tin compound, such as a methyl tin mercaptide is employed as stabilizer.

A more detailed description of suitable stabilizers, lubricants and processing aids for incorporation into the compositions of the invention is presented in the aforementioned U.S. application of G. Witschard, Ser. No. 881,949, filed Feb. 28, 1978 and in Belgian Pat. No. 855,764 issued Dec. 17, 1977, the disclosures of which are incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, *Plastics Engineering,* March 1976, "Additives 76", pages 3–4, the disclosure of which is incorporated herein by reference. In general the amount of each type of the aforementioned optional additive employed in the present composition is about 0.01 to about 5 weight percent, preferably about 0.1 to about 3 weight percent based on the total resin composition.

The compositions of the invention are essentially of the rigid vinyl halide resin type which contain no more than about 10 weight percent of a plasticizer for vinyl halide graft polymer and preferably are free of said plasticizing additive. Typical suitable plasticizer additives (which are generally organic compounds) conventionally employed in polyvinyl halide compositions include, for example, the esters of aliphatic alcohols of medium chain length, e.g. of 7 to 11 carbon atoms, with phenyl dicarboxylic acids, e.g. di-n-octyl phthalate and di-isononyl phthalate as well as organic phosphate esters such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

The compositions of the invention can be prepared by milling and mixing techniques conventional for preparing conventional impact-modified vinyl halide polymer polyblends, e.g. conventional ABS polymer modified polyvinyl halide. Generally the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as product from the milling and mixing operation is molded by either an injection or compression molding technique to articles of particular desired shapes at elevated temperature and pressure conditions which are conventional in molding rigid polyvinyl halide compositions. Desirably, a compression molding technique is employed to prepare the aforementioned articles which can be in various shapes including bars, plates, rings, rods, as well as sheets and films.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

A particulate solid mixture of 100 parts of a vinyl chloride homopolymer which is prepared by bulk liquid phase polymerization and has a Notched Izod impact resistance (ASTM Test D-256) in the range of about 0.4 to less than 1 ft.-lbs/in., 6.5 parts of a proprietary ABS (acrylonitrile-1,3-butadiene-styrene) polymer conventionally employed for impact resistance-enhancement of vinyl halide polymers (manufactured by Marbon Division, Borg Warner Corporation under the designation Marbon Blendex 401), 6.5 parts of a proprietary styrene-1,3-butadiene radial block polymer containing about 40% styrene and about 60% 1,3-butadiene (manufactured by Phillips Petroleum Co. under the designation Solprene 414-P), 2.85 parts of an acrylic polymer processing aid containing about 13% ethyl acrylate and 87% methyl methacrylate monomer residues conventionally employed in processing vinyl halide resins (manufactured by Rohm and Haas Corp. under the designation Acryloid K-120-ND), 1.14 parts of a proprietary short chain paraffin wax conventionally employed as an internal lubricant in molding vinyl halide polymers (manufactured by Cincinnati-Milicron Co. under the designation Advawax 140), 0.23 parts of proprietary wax which is a derivative long chain (28-32 carbon atoms) montan-wax acid which contains a diester of a dihydric alcohol and which is conventionally employed as an external lubricant (having some internal lubricant function) in molding vinyl halide polymers (manufactured by American Hoechst Corp. under the designation Wax E) and 1.8 parts of a proprietary methyl-tin mercaptide conventionally employed as a heat stabilizer in vinyl halide polymers (manufactured by Cincinnati-Milicron Co. under the designation TM-181) is added to the rolls of a Farrell Mill operating under the following conditions:

Front Roll Temperature: 360° F.
Back Roll Temperature: 340° F.
Roll Speed: 48 ft./min.

After fusion, the mixture remains on the mill rolls for about 5 minutes with the appearance of the bands of the mixture on the rolls being satisfactory. The mixture is delivered from the mill as a sheet which is allowed to cool to about ambient temperature (about 20°).

The resultant polyblend is compression molded as bars 6 inches in length, 6 inches in width and ⅛ inch in thickness employing a large Carver Press which operates under the following sequence of temperature and pressure conditions: 3 minutes at 350° F., 1000 psi; 2 minutes at 350° F., 30,000 to 32,000 psi; and 2 minutes at ambient temperature 30,000 to 32,000 psi.

The resultant molded bar samples are cut to provide bar samples of ½ inch width which are notched and tested for Notched Izod Impact resistance at ambient temperature and −20° F. substantially in accord with ASTM Test D256. The results of this test and appearance of the molded bar articles are presented in Table I below.

EXAMPLES 2-8

In a series of Examples 2-3, the procedure of Example 1 is repeated substantially as described employing different block polymers as follows:

Example 2—a radial block polymer containing 70% 1,3-butadiene and 30% styrene (manufactured under the designation Solprene 411-P by Phillips Petroleum Co.)

Example 3—a triblock polymer containing 86% isoprene and 14% styrene (manufactured under the designation Kraton 1107 by Shell Chemical Co.)

In a series of control Examples 4–8, the procedure of Example 1 is repeated substantially as described with either the ABS polymer or the block polymer being omitted. In Example 4, the proportion of the ABS polymer is varied while in Examples 6–8, the proportion of the block polymer is varied. The results of all of these Examples are compared with those of Example 1 in the Table below.

TABLE I

| EXAMPLE | % ABS POLYMER (on weight of total resin composition) | % BLOCK POLYMER (on weight of total resin composition) | NOTCHED IZOD IMPACT RESISTANCE VALUES (ft.lbs/in) | | APPEARANCE OF MOLDED ARTICLE |
|---|---|---|---|---|---|
| | | | Ambient Temp. | −20° F. | |
| 1 | 5.5 | 5.5 | 11.4 | 0.79 | Substantially transparent (slight haze); substantially colorless with slight attractive blue cast, no surface exudate. |
| 2 | 5.5 | 5.5 | 2.4 | 0.70 | Substantially transparent (slight haze) substantially colorless; no surface exudate. |
| 3 | 5.5 | 5.5 | 11.2 | 0.64 | Translucent substantially colorless; no surface exudate. |
| 4 (Control) | 0.9 | none | 1.2 | 0.50 | Substantially transparent and colorless; no surface exudate. |
| 5 (Control) | 5.8 | none | 0.97 | 0.5 | Substantially transparent and colorless; no surface exudate. |
| 6 (Control) | none | 10.9 | 1.6 | 0.77 | Very hazy, colorless, rough surface with substantial exudate on surface. |
| 7 (Control) | none | 10.9 | 1.3 | 0.66 | Very hazy, colorless, rough surface with substantial exudate on surface. |
| 8 | none | 10.9 | 2.6 | 0.92 | Opaque rough surface with substantial |

TABLE I-continued

| | % ABS POLYMER (on weight of total | % BLOCK POLYMER (on weight of total | NOTCHED IZOD IMPACT RESISTANCE VALUES (ft.lbs/in) | | APPEARANCE OF |
|---|---|---|---|---|---|
| EXAMPLE | resin composition) | resin composition) | Ambient Temp. | −20° F. | MOLDED ARTICLE |
| (Control) | | | | | exudate on surface. |

NOTE:
The above-described surface exudate in the molded products of Control Examples 6, 7 and 8 occurs in the molding of the compositions and appears as minute solid lumps on the surface of the product imparting a rough handle to the product surface.

A comparison of the ambient temperature impact resistance results of Example 1 (which illustrates the composition of the invention) with those of the control Examples 4–6 indicates that the impact resistance of the composition of the invention is synergistically enhanced by the combined presence, according to the invention, of both the block polymer and the ABS polymer.

Control Examples 6–8 further illustrate that the block polymer additive by itself in a vinyl halide resin is incompatible with the vinyl halide resin as especially indicated by the formation of a solid exudate on the surface of the products of these Examples.

What is claimed is:

1. In a vinyl halide polymer composition which is capable of being molded to an impact resistant article and which comprises a blend of a vinyl halide polymer wherein the major proportion of the monomer units are vinyl halide monomer residues and an acrylonitrile-1,3-butadiene-styrene polymeric impact modifier for poly-vinyl halide, said modifier comprising (1) a mixture of a copolymer of styrene and acrylonitrile with a minor amount of a copolymer of acrylonitrile and 1,3-butadiene, or (2) a mixture of a copolymer of styrene and acrylonitrile with a minor amount of a graft of said strene-acrylonitrile copolymer onto poly-1,3-butadiene, the improvement wherein the blend also comprises a block thermoplastic elastomer wherein the major proportion of the monomer units are residues of (1) a mono-alkenyl-substituted aromatic compound of the benzene or naphthalene series of 8 to 20 carbon atoms and (2) a conjugated alkadiene hydrocarbon of 4 to 10 carbon atoms, said block elastomer being normally incompatible with said vinyl halide polymer, said vinyl halide polymer being present in a proportion of about 50 to about 99 weight percent in said blend, and said acrylonitrile-1,3-butadiene-styrene polymeric modifier and said block elastomer together being present in a proportion of about one to about 50 weight percent in said blend.

2. The composition of claim 1 wherein the alkenyl aromatic compound is a hydrocarbon of the benzene series, the acrylonitrile-1,3-butadiene-styrene polymeric modifier has about the same refractive index as said vinyl halide polymer and the weight ratio of the block elastomer to acrylonitrile-1,3-butadiene-styrene polymeric modifier is about 5:1 to about 1:5, the ratio of said alkenyl aromatic compound to the alkadiene being about 1:1 to about 1:10.

3. The composition of claim 2 wherein the units of the block elastomer are styrene and 1,3-butadiene or isoprene, the proportion of acrylonitrile-1,3-butadiene-styrene polymeric modifier and the block elastomer in the composition is in the range of about 5 to 20 weight percent based on the weight of the blend, and the weight ratio of the block elastomer to the acrylonitrile-1,3-butadiene-styrene polymeric modifier is about 4:1 to about 1:4.

4. The composition of claim 3 wherein the vinyl halide polymer is a homopolymer of vinyl chloride and the proportion of the acrylonitrile-1,3-butadiene-styrene polymeric modifier and styrene block elastomer in the composition is about 8 to about 15 weight percent based on the weight of the blend.

5. The composition of claim 4 wherein the vinyl chloride polymer is a bulk-polymerized polymer of vinyl chloride.

6. The composition of claim 5 wherein the block elastomer is a styrene-1,3-butadiene block elastomer.

7. The composition of claim 6 wherein the weight ratio of the styrene to the 1,3-butadiene in the block elastomer is in the range of from about 1:1.5 to about 1:3.

8. The composition of claim 7 wherein the block elastomer is a radial block elastomer containing styrene and 1,3-butadiene monomer residues in the weight ratio of about 1:2.3 and the weight ratio of the block elastomer to the acrylonitrile-1,3-butadiene-styrenic polymer modifier is about 1:1.

9. The composition of claim 7 wherein the block elastomer is a radial block elastomer containing styrene and 1,3-butadiene monomer residues in a ratio of about 1:1.5 and the weight ratio of block polymer to acrylonitrile-1,3-butadiene-styrene polymeric modifier is about 1:1.

10. The composition of claim 5 wherein the block elastomer is a styrene-isoprene block elastomer.

11. The composition of claim 10 wherein the block elastomer is a triblock elastomer containing styrene and isoprene monomer residues in a weight ratio of about 1:6 and the weight ratio of the block elastomer to the acrylonitrile-1,3-butadiene-styrene polymeric modifier is about 1:1.

12. An impact resistant molded article formed from the composition of claim 1.

13. An impact resistant, substantially transparent or translucent molded article formed from the composition of claim 2.

14. A vinyl halide polymer composition which is capable of being molded to an impact resistant, substantially transparent or translucent article which comprises a blend of vinyl halide polymer wherein the major proportion of the monomer units are vinyl halide monomer residues; an acrylonitrile-1,3-butadiene-styrene, polymeric impact modifier for polyvinyl halide, said modifier comprising (1) a mixture of a copolymer of styrene and acrylonitrile with a minor amount of a copolymer of acrylonitrile and 1,3-butadiene, or (2) a mixture of a copolymer of styrene and acrylonitrile with a minor amount of a graft of said styrene-acrylonitrile copolymer onto poly-1,3-butadiene and having about the same refractive index as said vinyl halide polymer; and a block thermoplastic elastomer which consists of residues of a mono-vinyl-aromatic hydrocarbon compound of the benzene or naphthalene series of 8 to 20 carbon atoms and a conjugated alkadiene hydrocarbon of 4 to 10 carbon atoms, the proportion of said vinyl-aromatic hydrocarbon residues to said alkadiene residues being in the range of from about 1:1 to 1:10, said block elastomer being normally incompatible with said vinyl halide polymer, said vinyl halide polymer said vinyl halide polymer being present in a proportion of about 50 to about 99 weight percent in said blend, and said acrylonitrile-1,3-butadiene-styrene polymeric modifier and said block elastomer together being present in a proportion of about one to about 50 weight percent in said blend, and the weight ratio of said block elastomer to said acrylonitrile-1,3-butadiene-styrene polymeric modifier being about 5:1 to about 1:5.

* * * * *